Dec. 17, 1968 KOICHI MIZUNO 3,416,941
PROCESS FOR THE MANUFACTURE OF A BEARING SURFACE ON A STEEL
ARTICLE INCLUDING A SINGLE SINTERED LAYER OF BRONZE
PARTICLES AND A LAYER OF POLYTETRAFLUOROETHYLENE
Filed May 11, 1964

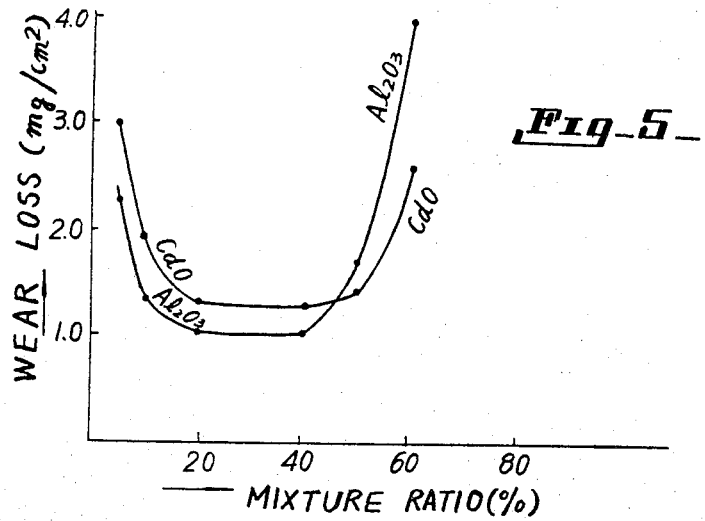
Fig-5-
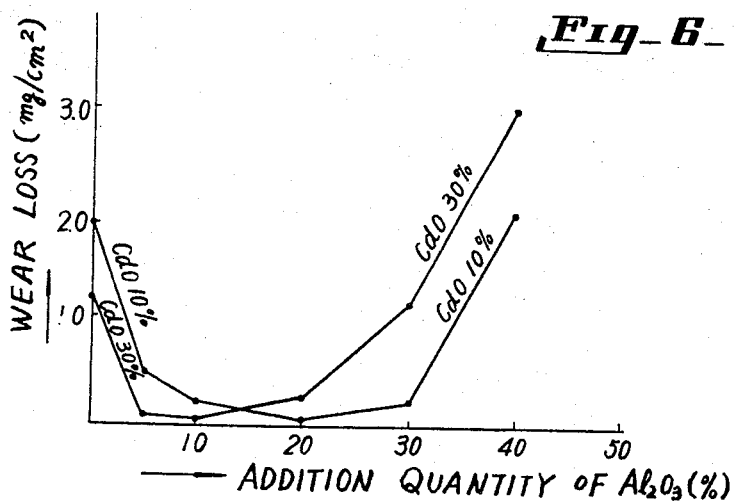
Fig-6-

United States Patent Office 3,416,941
Patented Dec. 17, 1968

3,416,941
PROCESS FOR THE MANUFACTURE OF A BEARING SURFACE ON A STEEL ARTICLE INCLUDING A SINGLE SINTERED LAYER OF BRONZE PARTICLES AND A LAYER OF POLYTETRAFLUOROETHYLENE
Koichi Mizuno, Tokyo, Japan, assignor of one-half to Daikin Kogyo Company Limited, Osaka, Japan, a corporation of Japan
Filed May 11, 1964, Ser. No. 366,249
Claims priority, application Japan, May 16, 1963, 38/25,784; Dec. 7, 1963, 38/65,693
7 Claims. (Cl. 117—22)

ABSTRACT OF THE DISCLOSURE

A process for the manufacture of a bearing surface on a steel article, comprising the steps of forming a rough keying surface on the article by sintering a monoparticle layer of bronze alloy particles scattered thereon at a temperature between 750° C. to 950° C. while using an ammonium halide aqueous solution as a binder to hold the particles on the steel article, and applying an anti-abrasive bearing layer on the rough keying layer by depositing a layer of an aqueous solution of polytetrafluoroethylene containing CdO and/or $Al_2O_3$ thereon and heating this deposited layer at a temperautre between 300° C. to 430° C.

---

This invention relates to a process for the manufacture of bearing surfaces on steel articles, more particularly to a process of forming bearing surfaces on steel articles by applying (covering) on the steel article surface a film consisting of polytetrafluoroethylene (to be abridged as PTFE hereinafter for brevity), and at least one of cadmium oxide (CdO) and alumina ($Al_2O_3$) and others.

In order to apply such a film firmly on the surface of the steel article, bronze alloy powders are scattered and sintered thereon to provide a rough surface layer of said bronze alloy powders prior to application of said film. According to the process of the invention, such a sintered rough surface layer of 0.04 to 0.2 mm. thick can be formed on a part or the entire surface of steel articles, such as, plates, bars, wires, tubes, pressed goods, etc., regardless of whether their surfaces are plane or curved. Such a sintered layer is formed by first wetting the surface of the steel article with an aqueous solution containing 5 to 30% of an ammonium halide, and then scattering and attaching bronze alloy powders onto the wetted surface, and thereafter sintering the bronze alloy powders thus attached on the steel article surface in an inert gas or in a reducing atmosphere at 750° C. to 950° C.

The process for manufacturing bearing surfaces according to the invention is comprised essentially of the following three major steps.

The first major step is to clean the steel article surface thoroughly, apply an extremely thin film of an aqueous solution containing 5 to 30% of an ammonium halide, and scatter bronze alloy powder particles on the formed thin film of the aqueous solution in order to form a mono-particle layer of such bronze alloy powder particles thereon.

The second step is to produce a sintered rough layer tightly adhering to the surface of the steel article by heating the scattered bronze alloy powder particles in an inert gas or in a reducing atmosphere at 750° C. to 950° C.

The third step is to produce the bearing surface on the above-mentioned sintered rough layer of bronze alloy powder particles by applying a mixed solution consisting of an aqueous dispersion of PTFE added with at least one of finely pulverized CdO and $Al_2O_3$ on said sintered layer so as to form a covering film thereon, then drying to remove moisture therein, and finally forming the bearing film by heating at a temperature in the range of 300° C. to 430° C.

According to one of the important features of the invention, an excellent bearing surface can be produced on a part or the entire surface of steel articles regardless of the configurations of the steel article surface, such as a simple plane surface or an intricately curved surface.

Each major step of the process of the invention will now be explained in detail.

In the first major step of the process of the invention, the bronze alloy powder particles to be scattered on the clean bare surface of the steel article consists essentially of 5 to 15% Sn, 95 to 80% Cu, and less than 5% of at least one of Ni, Ag, Mn and Pb as an impurity. For reasons to be described hereinafter, phosphor bronze alloy powders comprising 5 to 15% of Sn, less than 2% of phosphor, and the remainder of copper are sometimes used with considerable advantage. It is also permissible to use particles of a mixture of metals consisting of the same ingredients with those of either of the above-mentioned bronze and phosphor bronze alloys.

According to the process of the invention, the grain size of the bronze alloy particles are so selected that the mean diameter of the bronze alloy powder particles is in the range of 0.1 to 0.04 mm.

The steel article to be provided with the bearing surface is first cleaned thoroughly by degreasing and deoxidizing and then wetted by applying an extremely thin film of aqueous solution containing 5 to 30% of ammonium chloride ($NH_4Cl$), thereafter dry bronze alloy powder particles are scattered and attached on the wetted surface. Upon completion of scattering, the scatter surface of the steel article is inclined, say to a vertical position or an upside-down position, while gently shaking, then those powder particles which are so attached as to make direct contact with the steel surface are retained thereon, but excess powder particles having no direct contact with the steel article surface are substantially completely dropped away.

It is very important to have a "mono-particle layer" of the bronze alloy powder particles on the steel article in order to obtain excellent bearing surface. What is meant by the "mono-particle layer" here is such a layer which consists of powder particles while having only one powder particle disposed in the direction of the thickness of the layer. According to the process of the invention, as illustrated in the above descriptions with regard to the application of ammonium halide solution and scattering of bronze alloy powder particles, there is only a very remote chance of depositing additional powder particles upon those which adhere directly to the steel surface, and hence, said mono-particle layer of bronze alloy powder particles is produced successfully on the preselected portions of the steel article surface without failure.

The above disposition of the mono-particle layer of bronze particles is possible as long as the powder particles to be scattered on the steel surface are kept dry, because dry bronze particles do not stick to each other and such dry powder particles are separated from each other and pulled downwards by the gravitational force when their supporting plane is inclined while vibrating to a vertical or to an upside-down position. On the other hand, those powder particles wetted and attached to the bare steel surface by said aqueous solution are retained on the steel surface. Therefore, due care should be paid not to leave excess solution on the steel article surface when applying said aqueous solution on the steel article and if there is any excess solution left thereon, then it may result in more than a few layers of bronze alloy powder particles deposited on the steel surface.

It has been ascertained by the inventor through experiments that as long as well dried bronze alloy powder particles having a mean diameter of 0.04 to 0.1 mm. are scattered on the steel surface, the resultant thickness of the sintered layer obtained thereby is always kept within a range of 0.04 to 0.20 mm.

It should be noted that the process of the invention is not limited to the plane surface only, but it is also applicable to both sides of a steel plate, peripheral outer surfaces of a bar and a wire, outer and inner surfaces of a cylinder, a part or entire curved surface of pressed goods, etc. According to the process of the invention, even in the case of such intricate configuration of the curved surfaces, when thus wetted and scattered steel surface is inclined and shaken, then only those bronze alloy powder particles which make direct contact with the wetted steel surface are kept thereon, whilst all other powder particles are removed therefrom, thus a substantially mono-particle layer of the bronze alloy powders can be obtained.

The preferred ammonium halide to be used in accordance with the invention is ammonium chloride ($NH_4Cl$), however, amonium bromide ($NH_4Br$) or ammonium iodide ($NN_4I$) can also be used alone or can be added into a solution of $NH_4Cl$ as an additive thereto. The concentration of such ammonium halide in the aqueous solution should be 5 to 30%, judging from its workability.

The reason for limiting the concentration of the ammonium halide in the aqueous solution to 5 to 30% is due to the fact that such ammonium halide applied on the steel surface acts as a binder to hold bronze alloy powder particles applied thereto even after the moisture in the aqueous solution is eliminated by drying, thereby bronze alloy powders adhering on a curved surface, a vertical surface or an upside-down surface are retained tightly on respective surfaces, and the most suitable concentration of ammonium halide for such binding action was found to be 5 to 30%.

In the second step of the process of the invention, the bronze alloy powder particles scattered on the steel article are sintered by heating them in an inert gas or in a reducing atmosphere at a temperature between 750° C. to 950° C., and during this sintering process, the above-mentioned amonium halide acting as a binder to hold bronze alloy powder particles on the steel article surface will be sublimated at a certain sublimating temperature. The sublimating temperatures of $NH_4Cl$, $NH_4Br$ and $NH_4I$ are 335° C., 542° C. and 551° C., respectively.

Accordingly, the sintering operation should be conducted in such a manner that the sintering reaction between the steel and the bronze alloy may begin well before the complete sublimation of the ammonium halide which activates the surfaces of particles and steel, and then accelerates to stick powders to the steel.

The concentration of ammonium halide in the aqueous solution to be applied to the clean bare steel surface, which is within the range of 5 to 30%, is of vital importance in this second step, that is, if the concentration of the ammonium halide is less than 5%, then the bronze alloy powder particles in the mono-particle layer formed on the curved surface, vertical surface, or upside-down plane surface of the steel article are liable to drop down at least partially before the temperature reaches the sublimating temperature, whilst if the concentration of the ammonium halide is higher than 30%, then the quantity of sublimated ammonium gas and halogen gas is so large that the bronze alloy powder particles are easily blown off from such surfaces due to the excessive pressure of gases thus produced. Therefore, the most suitable content of the ammonium halide from the standpoint of the workability is 5 to 30%.

The addition of phosphor accelerates alloying reaction of the bronze with steel, thereby the bronze alloy powders are retained more tightly on the steel surface even at curved portions when phosphor is added.

One of the important objects of the invention is to take advantage of the facts that ammonium halides sublimate on the one hand and act as an activating agent between the steel and the bronze alloy on the other hand in order to stick the bronze alloy powder particles on flat surfaces as well as curved surfaces of steel articles.

The sintering temperature is in the range of 750° C. to 950° C., and bronze alloys having high content of tin are sintered at comparatively low temperatures while those having low content of tin are sintered at higher temperatures. In practice, bronze alloy containing 5 to 15% of tin and phosphor bronze alloy powders containing less than 2% of phosphor in addition to 5 to 15% of tin can be sintered satisfactorily at a temperature in the range of 750° C. to 950° C.

The duration of heating for the sintering process depends on the size, configuration and volume of the steel article to be treated, and such duration usually falls within a range of 10 to 90 minutes.

It has been ascertained by experiments that the thickness of thus sintered mono-particle layers is always 0.04 mm. to 0.20 mm., provided that bronze alloy powder particles of said grain size are sintered according to said process of the invention.

The third step will be now explained in detail. A mixed solution prepared by adding at least one of pulverized CdO and $Al_2O_3$ into aqueous dispersion of PTFE is then applied to the rough surface of bronze alloy powder layer of 0.04 to 0.20 mm. thick, thus sintered on the steel surface. The sintered layer is thus impregnated and filled with the mixed solution, and then covered with a film of said mixed solution. After being dried to eliminate the moisture thereof, the film is heated at a temperature between 300° C. to 430° C. in order to obtain desired bearing surface adhering on the steel surface. The aqueous dispersion of PTFE for the present purpose usually contains 60% by weight of solid PTFE. The CdO and $Al_2O_3$ should be finely pulverized prior to adding to said aqueous dispersion, and the preferable grain size of such CdO and $Al_2O_3$ is 0.1 to 20.0 microns in the mean diameter.

The mixed solution can be applied on the rough sintered layer of bronze alloy powders by a suitable method, such as painting with brushes, spraying, dipping, etc. The thickness of the film of thus applied aqueous solution should be 0.02 to 0.05 mm., and suitable process for obtaining such thickness can be selected by preliminary tests based on the trial and error method.

According to the invention, the preferable composition of the mixed solution consists essentially of 30 to 95%, preferably 50 to 70%, of solid PTFE, 5 to 50%, preferably 20 to 45%, of at least one of CdO and $Al_2O_3$. Also permissible is to add 0 to 30% of one of $Fe_2O_3$ and $Cr_2O_3$, 0 to 10% of $MoS_2$ and 0 to 20% of PbO into the mixed solution of said essential components.

The addition of $Fe_2O_3$ or $Cr_2O_3$ at a rate less than 30% is effective for improving the anti-abrasiveness of the bearing film, and the content of $MoS_2$ at a rate less than 10% and PbO at a rate less than 20% is to reduce the coefficient of friction of the bearing film.

As described in the foregoing, the mixed solution to be applied on the sintered rough surface is ordinarily made by applying one or more pulverized CdO and $Al_2O_3$ and other suitable ingredients into the aqueous dispersion containing 60% of solid PTFE at certain preferred ratios, respectively. However, it is only natural that such ratios of said solid ingredients are changes after the mixed solution is applied on the rough surface of mono-particle bronze layer and the mixture therein is removed. For instance, a mixed solution containing 80% of said aqueous dispersion consisting of 60% of solid PTFE and 20% of pulverized CdO will produce a bearing film consisting of 70.6% of solid PTFE and 29.4% of CdO after being dried.

For a better understanding of the invention, reference is taken to the accompanying drawings, in which:

FIGURE 5 is a curve diagram illustrating relations between the mixture ratios of CdO and $Al_2O_3$ in percent and the wear loss in mg./cm.$^2$; and FIGURE 6 is a curve diagram illustrating the wear losses for different addition quantities of CdO and $Al_2O_3$.

Figure 1:
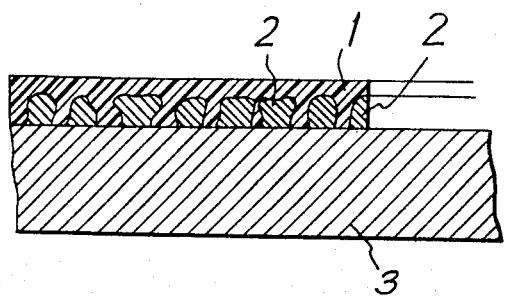
FIGURE 1 is a partial sectional view illustrating the structure of the bearing surface provided on a steel plate according to the process of the invention.

Referring to FIG. 1, reference numeral 1 represents a coated film forming the bearing surface, 2 is a layer of bronze alloy powder particles which form a rough surface on the steel article 3.

Figure 2A:
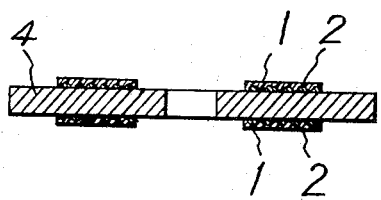
FIGURES 2A and 2B are a sectional view and a plan view, respectively, of a steel washer having bearing surfaces applied on both sides thereof according to the process of the invention.
Figure 3A:
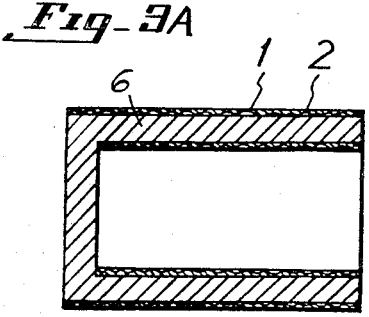
FIGURES 3A and 3B are a vertical sectional view and an end view, respectively, of a steel pipe applied with bearing film of the invention on both inner and outer peripheral surfaces thereof.

In FIGS. 2A and B, certain preselected portions on both surfaces of a circular steel plate 4 are at first covered with the rough layer 2 of bronze alloy particles, and then the bearing film 1 is applied to the surface of the layer; this may be used for various washers, seal plates, slide plates etc. In FIGS. 3A and B, a bronze alloy particle layer 2 and a coating film 1 are formed on the inner and outer surfaces of a steel pipe 6, and this may be used for cylinder, bearing bush etc. in the case of application only to the inside surface, and for piston, sliding tube etc. in the case of application only to the outer surface.

Figure 4:
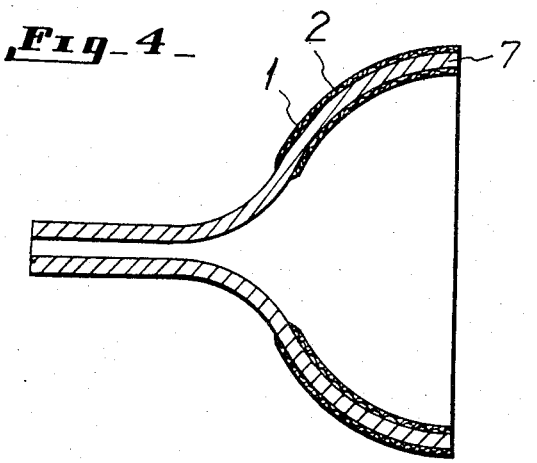
FIGURE 4 is a sectional view of a funnel-shaped steel pipe provided with the bearing film of the invention on both inner and outer surfaces of the bulged portion thereof.

FIG. 4 shows a bulged-out portion 7 of steel pipe in which a particle layer 2 and a coating film 1 are formed on the inner and outer surfaces of the funnel-shaped portion and the product of such shape may be obtained by casting and has many applications. According to the process of the invention, the bearing sliding surface can be provided to the surface of steel articles having any shape, size, area and in any position.

FIGS. 5 and 6 illustrate the results obtained by determining the wear loss of the coated film described above by means of an abrasion tester, and a continuous dry abrasion test was performed at a sliding speed of 1.0 m./sec. with a load of 10 kg./cm.$^2$ for 20 hours. A test piece was obtained by coating a steel plate of 1.0 mm. thick with a 0.1 mm. thick sintered layer of phosphorus bronze alloy powder particles consisting of 10% Sn, 0.2% of P and the remainder of Cu, which passed a 200 mesh B.S. sieve but not a 320 mesh B.S. sieve. A mixed solution prepared by adding a mixture of CdO and $Al_2O_3$ into an aqueous dispersion containing 60% by weight of solid PTFE at a varying ratio is applied on rough surface of thus sintered layer and a bearing film of 0.05 mm. thick was produced thereon.

FIG. 5 shows the relationship between the amount of CdO and $Al_2O_3$ added to PTFE and the wear loss, CdO and $Al_2O_3$ within the range of 5 to 50% showing smaller wear loss and the amount below 5% and above 50% seems to be unsuitable because of their high wear losses. Judging from FIGURE 5, the most effective content of CdO and $Al_2O_3$ are 20 to 50% and 20 to 40%, respectively. It was also found through tests on various combinations of optional ingredient that the anti-abrasive property of the bearing surface was further improved by adding at least one ingredient selected from the group consisting of less than 30% of $Fe_2O_3$, less than 30% of $Cr_2O_3$, less than 10% of $MoS_2$, and less than 20% of PbO.

FIGURE 6 shows effects of adding $Al_2O_3$ into two kinds of mixed solutions for bearing surfaces, that is, one consisting of 10% of CdO and the remainder of PTFE and the other one consisting of 30% of CdO and the remainder of PTFE. While the wear loss of coated film having the composition of 70% PTFE and 30% CdO was 1.4 mg./cm.$^2$, the loss was decreased suddenly by adding 5% $Al_2O_3$. The minimum abrasion was obtained by adding $Al_2O_3$ in the range of 5 to 10% and the abrasion began to increase when the addition quantity of $Al_2O_3$ increased beyond 10%, and the addition in excess of 30% gave no improvement. When $Al_2O_3$ was added to the bearing surface containing 10% of CdO, the wear loss was decreased greatly at 5% $Al_2O_3$, the wear loss was gradually reduced as the addition quantity of $Al_2O_3$ is increased up to 20%, but the loss was turned to increase suddenly when the addition quantity of $Al_2O_3$ was increased beyond 30%. It is thought that the sum of CdO and $Al_2O_3$ below 50% is practicable.

As described above, it has been found that the anti-abrasive property of the bearing film obtained by mixing PTFE with one or more of CdO and $Al_2O_3$ is remarkably improved compared with the film coating of PTFE only. It is also desirable to add at least one of $MoS_2$ and PbO powders as an optional component thereto as this component serves to minimize the coefficient of friction and the evolution of friction heat.

Thus, according to the invention, a bearing surface can be formed on a part or the whole surface of any steel article regardless whether its surface is plane or curved. The bearing surface can be applied to one or both surfaces of a continuous steel plate, and to any one of wire, bar, moulded product and cast product as well as a raw or finished material or article.

The anti-abrasive property of the coated film which constitutes the bearing surface is very excellent and the film shows a stable sliding property under dry conditions without using lubricant, but lubricant may of course be used.

The invention will now be further explained in detail by examples.

EXAMPLE 1

An example of operation in which a bearing surface is formed on one side of a steel plate will be described in the following:

(1) A cold rolled steel plate of 1.50 mm. thickness, 160 mm. width and 1,000 mm. length was degreased, deoxidized, washed with water, and dried in a drying chamber.

(2) The plate thus treated was dipped in a bath containing the aqueous solution of 25% $NH_4Cl$ and 75% water.

(3) After removing excess water from the steel plate, phosphorus bronze alloy powder was scattered uniformly on one surface of the steel plate. A screen of 260 meshes was used to spread the powder by vibrating the screen. The particle size of the powder used was between 150 to 200 mesh. The composition of the phosphorus bronze alloy consisted of 9.50% Sn, 0.20% P and 90.30% Cu.

(4) The steel plate was held vertically to remove the excess powder.

(5) The steel plate, thus applied with bronze alloy powders, was then placed on a conveyor and transported into a hydrogen electric furnace. After heating at 850° C. for 30 minutes at a transporting speed of 100 mm./min., the plate was carried out of the furnace through a cooling chamber.

(6) A mixed liquid consisting of 77% aqueous PTFE dispersion (60% solid) and 23% CdO powder was coated on the rough surface by spraying. The amount of mixed liquid used was 300 g./m.$^2$.

(7) After drying, it was heated at 370° C.

(8) The plate was press rolled to 1.55 mm. in thickness.

Through the processes described above, a plate of 1.55 mm. thickness, 160 mm. width and 1,000 mm. length was obtained. The mean thickness of coated film which formed the bearing surface on the steel plate was 0.03 mm. and the mean thickness of the phosphorus bronze particle layer was 0.05 mm. and the thickness of steel plate 1.47 mm. The composition of the coated film after removing moisture by heating was 67% solid.

EXAMPLE 2

A steel wire having a diameter of 2.99 to 3.01 mm. was coated with a bearing surface in the following manner:
 (1) The wire was deoxidized, degreased washed with water and then moved into a drying chamber.
 (2) It was passed into a bath containing an aqueous solution of 15% $NH_4Cl$, 5% $NH_4Br$ and 80% water.
 (3) The wire was passed vertically through a spraying chamber of bronze powder which adhered to the wire. The above bronze alloy powder consisted of 12.0% of Sn and 88% of Cu. The mean grain size of the particle used was between 200 to 300 mesh.
 (4) The wire was passed downwards into a vertical hydrogen electric furnace, heated at 800° C. for 30 minutes and then passed through a cooling chamber.
 (5) The wire was conveyed horizontally through a bath of mixed liquid and the excess liquid was removed by a brush. The mixed liquid consisted of 80% by weight of aqueous PTFE dispersion (60% solid) and 20% by weight of $Al_2O_3$.
 (6) The wire then entered a drying chamber for heating at 360° C. and then into a case.
 (7) The wire was passed through a die of 3.14 mm. for sizing.

Thus, the wire having a diameter of 3.00 mm. had a diameter of 3.14 mm. after the treatment and the sum of the phosphorus bronze particle layer and surface coated film layer was 0.07 mm. The composition of the coated film consisted of 67.7% solid PTFE and 32.3% $Al_2O_3$.

EXAMPLE 3

Figure 2B:
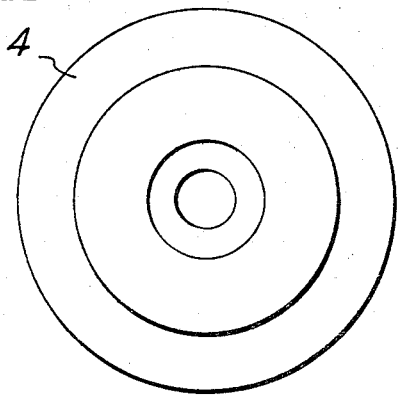

A seal plate as shown in FIG. 2 was manufactured as follows:
 (1) A steel plate of 150 mm. dia. and 4.00 mm. thickness was degreased and deoxidized to clean all surfaces.
 (2) An aqueous solution of 25% $NH_4Cl$ was applied by means of a brush to that portion of the steel plate whereon a bearing surface was to be formed and then the excess solution was removed.
 (3) A phosphorus bronze powder consisting of 1.50% P, 8.0% Sn and balance of Cu was scattered on the wetted portion through a screen of 100 meshes. The size of powder particle was 100 to 150 meshes. After spreading, the steel plate was held vertically to remove the excess of powder.
 (4) The plate was heated at 850° C. for 60 hours.
 (5) The plate was coated by brushing with a mixed liquid consisting of 70% aqueous PTFE dispersion (60% solid), 20% CdO, 5% PbO adn 5% $Al_2O_3$ and dried.
 (6) Heated at 380° C.
 (7) Both surfaces of the plate were pressed at a pressure of 1,000 kg./cm.$^2$ to smooth the bearing surface and to adjust the thickness. The thickness obtained was 4.40 mm.

In the bearing surface thus coated on the steel plate, the mean thickness of phosphorus bronze particle layer was 0.17 mm. and the mean thickness of coated film 0.03 mm. The composition of coated film consisted of 58% solid PTFE, 28% CdO, 7% PbO and 7% $Al_2O_3$.

EXAMPLE 4

Figure 3B:
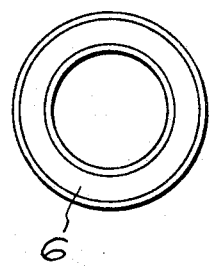

Bearing surfaces were formed on the inner and outer surfaces of a steel pipe as shown in FIG. 3.
 (1) The inner and outer surfaces of a steel pipe of 30.20 mm. inner dia., 39.80 mm. outer dia. and 100 mm. length were lathe-finished.
 (2) The pipe was degreased and deoxidized to clean the surface.
 (3) The pipe was dipped in an aqueous solution containing 15% $NH_4Cl$ and 5% $NH_4I$ and the excess liquid was removed.
 (4) A phosphorus bronze alloy powder was spread on the inner and outer surfaces through a screen of 150 meshes, the pipe was rolled and held vertically to remove the excess powder. The mean size of powder particle was 200 to 150 meshes and the mean diameter 0.10 to 0.07 mm. The composition of phosphorus bronze powder was 1.0% P, 10% Sn and 89% Cu.
 (5) The pipe was heated at 800° C. for 30 minutes in a hydrogen electric furnace.
 (6) Both surfaces of the pipe were coated with a mixed liquid consisting of 65% aqueous PTFE dispersion (60% solid), 20% $Al_2O_3$ and 15% CdO and heated at 380° C.
 (7) The inner and outer surfaces of the coated pipe were finished to smooth the sliding surface and the dimension of inner dia. was 30.00 mm. and of outer dia. 40.00 mm.

In the steel pipe thus provided with bearing surfaces, the thickness of the layer treated was 0.10 mm. and the composition of the coated film was 52.7% solid PTFE, 27% $Al_2O_3$ and 20.3% CdO.

EXAMPLE 5

Inner and outer surfaces of the opening of a moulded product of funnel-shape as shown in FIG. 4 were treated as follows to form sliding bearing surfaces:
 (1) A steel pipe of 2.5 mm. thickness was press worked to form a funnel shaped article as shown in FIG. 4. The weight was 4.2 kg. and the outer dia. of the opening was 150 mm.
 (2) The article was degreased and deoxidized to clean the whole surface.
 (3) The portions for providing the bearing sliding surfaces were dipped in an aqueous solution containing 20% $NH_4Cl$ and the excess solution was removed.
 (4) A phosphorus bronze alloy powder having average size of 320 meshes was spread on both inner and outer surfaces, and the excess powder was removed.
 (5) The article was placed in a hydrogen electric furnace and heated at 820° C. for 60 minutes.
 (6) A mixed liquid of aqueous PTFE dispersion which gave a film coating consisting of 77.5% solid PTFE, 19.5% $Al_2O_3$ and 3.0% $MoS_2$ was applied to the rough surfaces of phosphorus bronze alloy powder particles, and after drying, it was heated at 380° C.
 (7) The article thus coated with film was placed in a die and pressed repeatedly to smooth the inner and outer surfaces and correct the dimension accurately.

What I claim is:
 1. A process for the manufacture of a bearing surface on a steel article, comprising the steps of wetting predetermined portions of the surface of said steel article by applying an aqueous solution containing 5 to 30% by weight of an ammonium halide onto said predetermined portions; scattering pulverized bronze alloy particles onto said wetted portions in such a manner that a mono-particle layer of the pulverized bronze alloy particles is produced thereon; sintering the thus scattered bronze powders by heating in an inert or reducing gas atmosphere at a temperature of between 750° C. to 950° C. thus providing a rough surface layer on said predetermined portions of said steel article; applying a mixed aqueous solution on said rough surface layer of bronze alloy particles to fill up the interspaces between said fine powder particles; and heating the thus applied mixed solution together with the steel article at a temperature of between 300° C. and 430° C. to form the desired bearing surface on the steel article, said mixed aqueous solution consisting essentially of an aqueous dispersion of 30 to 95% by weight polytetrafluoroethylene and 5 to 50% by weight based on the weight of said aqueous dispersion in total sum of at least one oxide selected from the group consisting of CdO and $Al_2O_3$, and mixtures thereof.

2. The process of claim 1 wherein said pulverized bronze alloy consists of 5 to 15% of Sn, 95 to 80% of Cu.

3. The process of claim 1, wherein said pulverized bronze alloy contains an impurity of up to 5% of at least one metal selected from a group consisting of Ni, Ag, Mn, Pb and mixtures thereof.

4. The process of claim 2 wherein said pulverized bronze alloy is a pulverized phosphorus bronze alloy consisting essentially of an impurity amount, but less than 2% of P, 5 to 15% of Sn, and the remainder of Cu.

5. The process of claim 1 wherein the thickness of said rough layer formed by sintering said pulverized bronze particles is 0.04 to 0.1 mm.

6. The process of claim 1 wherein said aqueous dispersion comprises 50 to 70% by weight of polytetrafluoroethylene and 20 to 45% by weight based on the weight of said aqueous dispersion in total sum of at least one oxide selected from the group consisting of CdO, $Al_2O_3$ and mixtures thereof.

7. The process of claim 1 wherein said aqueous dispersion contains at least one powder selected from the group consisting of 0 to 30% by weight of the total sum of $Fe_2O_3$ and $Cr_2O_3$, 0 to 10% by weight of $MoS_2$ and 0 to 20% by weight of PbO.

References Cited

UNITED STATES PATENTS

| | | | |
|---|---|---|---|
| 2,691,814 | 10/1954 | Tait | 117—75 |
| 2,972,551 | 2/1961 | Fringhian | 117—31 |
| 2,995,462 | 8/1961 | Mitchell et al. | 117—71 |
| 3,143,241 | 8/1964 | Howell | 117—75 |
| 3,211,325 | 10/1965 | Wisnicki | 117—71 |
| 3,271,653 | 9/1966 | Wolf | 117—71 |

WILLIAM D. MARTIN, *Primary Examiner.*

P. ATTAGUILE, *Assistant Examiner.*

U.S. Cl. X.R.

117—26, 50, 71, 75